United States Patent
Perepa et al.

(10) Patent No.: US 6,879,669 B1
(45) Date of Patent: Apr. 12, 2005

(54) METHOD AND APPARATUS FOR ENABLING A PRIVACY FEATURE IN A COMMUNICATIONS NETWORK

(75) Inventors: Bhargav V. Perepa, Austin, TX (US); Sujatha Perepa, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 10/675,742

(22) Filed: Sep. 30, 2003

(51) Int. Cl.[7] .............................................. H04M 11/00
(52) U.S. Cl. .................. 379/93.27; 379/52; 379/93.15; 380/257
(58) Field of Search ................................ 379/52, 93.05, 379/93.08, 93.17–93.19, 93.23–93.28, 442; 380/257, 269, 275, 266, 41, 52, 59; 713/153

(56) References Cited

U.S. PATENT DOCUMENTS

| | | | | |
|---|---|---|---|---|
| 5,455,861 A | * | 10/1995 | Faucher et al. | 380/266 |
| 5,594,798 A | * | 1/1997 | Cox et al. | 380/257 |
| 5,974,142 A | * | 10/1999 | Heer et al. | 379/442 |
| 5,995,590 A | * | 11/1999 | Brunet et al. | 379/52 |
| 6,266,418 B1 | * | 7/2001 | Carter et al. | 380/257 |

* cited by examiner

*Primary Examiner*—Wing Fu Chan
(74) *Attorney, Agent, or Firm*—Duke W. Yee; Leslie A. Van Leeuwen

(57) ABSTRACT

A method, apparatus, and computer instructions for securely transferring information in a communications system. Signals are generated by a communications keypad. In response to receiving an input indicating activation of a secure data transfer mode, these signals are converted from the communications keypad into speech signals, and the speech signals are transmitted to a receiving party.

23 Claims, 3 Drawing Sheets

METHOD AND APPARATUS FOR ENABLING A PRIVACY FEATURE IN A COMMUNICATIONS NETWORK

BACKGROUND OF THE INVENTION

1. Technical Field

The present invention relates generally to an improved communications system and in particular to a method and apparatus for transferring data over a communications system. Still more particularly, the present invention relates to a method, apparatus, and computer instructions for securely transferring data over a communications system.

2. Description of Related Art

The public switched telephone network (PSTN) is the oldest and largest telecommunications network in existence. The PSTN is an analog network providing analog access at the 300 Hz to 3400 Hz range. Other types of communications networks use digital technologies, such as integrated services digital network (ISDN) and fiber distributed data interface (FDDI). Communications networks are used for many different purposes. For example, users or customers may talk to friends or relatives using the communications network. Further, business transactions may be conducted using a communications network.

In some cases, it may be necessary for a customer or user to communicate personal and confidential information to another person on the other end of a phone line in a communications network. This communication of information may occur without adequate privacy for one or both parties on the phone line. Such a situation may occur when two or more people share an office or when a call is made from a public telephone. In some cases, inquiries or requests may require the exchange of private information.

For example, if a customer calls a number for company benefits, a bank, a hospital, or an investment firm, private or confidential information may be required as part of the transaction or conversation. Typically, one customer or user may be required to give a social security number, age, date of birth, or password to verify or obtain authorization to obtain information or perform various transactions. Currently, a customer or user must find a private location or speak in a low enough voice to avoid others overhearing the private or confidential information. In some cases, the user may not be able to find a private location in which to convey this information.

Therefore, it would be advantageous to have an improved method, apparatus, and computer instructions for securely transferring information over a communications network during interactive conversations between users.

SUMMARY OF THE INVENTION

The present invention provides a method, apparatus, and computer instructions for securely transferring information in a communications system. Signals are generated by a communications keypad. In response to receiving an input indicating activation of a secure data transfer mode, these signals are converted from the communications keypad into speech signals, and the speech signals are transmitted to a receiving party.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
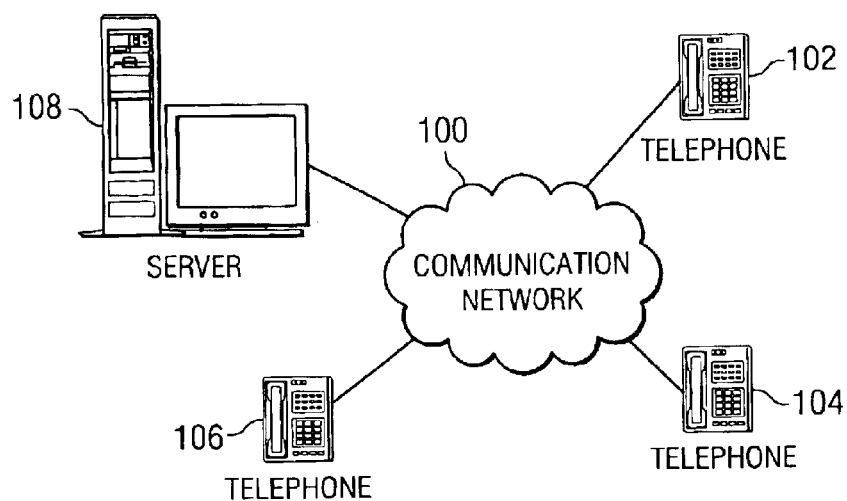
FIG. 1 is a communications network in accordance with a preferred embodiment of the present invention.

With reference now to the figures and in particular with reference to FIG. 1, a communications network is depicted in accordance with a preferred embodiment of the present invention. Communication network 100 is an example of a communications network in which the present invention may be implemented. Communication network 100 may include various networks, such as a public switched telephone network (PSTN), an integrated services digital network (ISDN), the Internet, or a fiber distributed data interface (FDDI) network. Communication network 100 may include copper wire, fiber optics, and wireless transmission links to provide for voice and data transmissions.

In these illustrative examples, telephones 102, 104, and 106 are connected to communication network 100. A user at telephone 102 may initiate a call to a person at telephone 104 for an interactive conversation between users. Further, server 108 may provide various functions and features on communication network 100 including those of the present invention.

The present invention provides a method, apparatus, and computer instructions for a privacy or secure feature for interactive conversations between human parties over communication network 100. A user at telephone 102 may indicate that a secure or privacy function is desired to initiate a secure data transfer function. When that function is activated, input is taken from a keypad or other non verbal user interface. The input from a microphone on telephone 102 may be ignored depending on the particular implementation. The signals from the keypad are converted into speech and sent across communication network 100 to telephone 104.

This feature and the conversion of keypad signals into speech may be performed through logic located in telephone 102. In other instances, this function may be provided as part of communication network 100 through server 108. Further, an indicator at telephone 104 may be provided to allow the user at telephone 104 to have a visual queue that a privacy feature has been initiated or activated. Such a feature helps the user at telephone 102 to preserve the confidentiality of information in the event that privacy from others may not be found where telephone 102 is located. This feature is especially useful for when the conversation is between two persons rather than with an automated machine on the other end. In this manner, confidential or private information, such as a social security number or date of birth, may be transmitted by a user from telephone 102 to a user at telephone 104.

Figure 2:
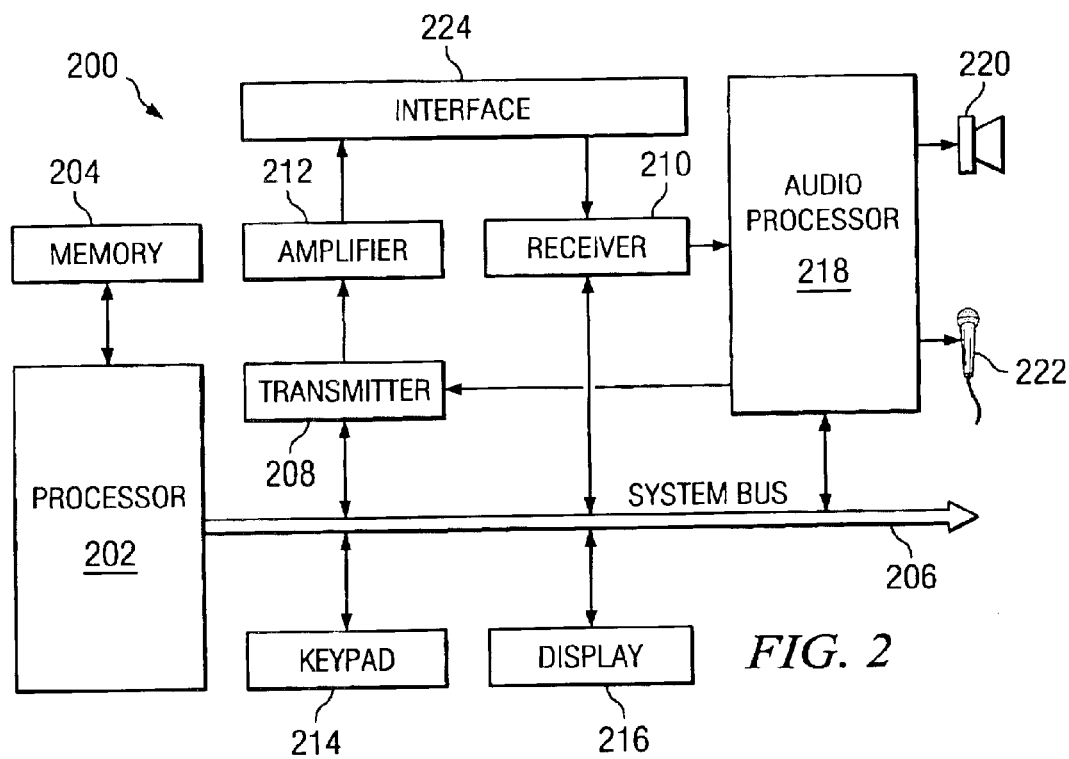
FIG. 2 is a block diagram of a communications device in which a preferred embodiment of the present invention may be implemented.

Next, FIG. 2 is a block diagram of a communications device in which a preferred embodiment of the present invention may be implemented. Communication device 200 is a telephone that includes processor 202 and memory 204. Processor 202 functions to control operation of communication device 200 and may be a general-purpose microprocessor operating under the control of instructions stored in a memory, such as memory 204, or device-specific circuitry for controlling the operation of the telephone device.

Processor 202 is connected by system bus 206 to transmitter 208, receiver 210, keypad 214, display 216, and audio processor 218. Keypad 214 is the user interface for non verbal input in these illustrative examples and may be a numeric keypad and may include other function buttons or alpha character buttons. Keypad 214 generates signals, in these examples, which are dual tone multi frequency (DTMF) signals used by touchtone telephones. With DTMF signals, a specific frequency or tone is assigned to each key to allow the signals to be easily identified by a processor.

Display 216 in communication device 200 may be any type of display device including a liquid crystal display (LCD) or other known displays, such as a cathode ray tube or active matrix display.

Transmitter 208 and receiver 210 are coupled to a telephone signal by interface 224 to provide full duplex communication. The telephone signal may be provided by a telephone line (not shown) in a land-based telephone or an antenna, for a wireless telephone. Audio processing circuit 218 provides basic analog audio outputs to speaker 220 and accepts analog audio inputs from microphone 222. Received signals are demodulated and decoded by receiver 210. Transmitter 208 encodes and modulates signals passed to it by processor 202 or audio processor 218. The output of the transmitter is amplified by power amplifier 212 to control the power level at which the signal is transmitted.

Processor 202 or audio processor 218 may detect audible call status information and call status codes received by receiver 210. Memory 204 may include a lookup table associating call status information or call status codes with visual call status information, such as text messages. Processor 202 detects or receives a call status code and displays an appropriate call status message on display 216. Those of ordinary skill in the art will appreciate that the hardware depicted in FIG. 2 may vary.

Communications devices may take various forms, such as a LAN line telephone or a wireless mobile phone. In these examples, the privacy or security feature of the present invention may be implemented as logic within communication device 200. Specifically, instructions may be included for execution by a processor to a tube to provide the privacy or security feature of the present invention. Alternatively, an applications specific integrated circuit may be designed to provide these features with such an ASIC being connected to system bus 206. DTMF tones generated by keypad 214 may be transformed or converted into speech for transmission to a receiving party when providing secure data transfer features of the present invention. Additionally, display 216 may provide an indicator, such as a message "privacy feature enabled" when the privacy or security feature has been activated.

In another embodiment of the present invention, a data processing system, such as server 108 in FIG. 1 may receive signals, such as DTMF signals generated by a keypad on a user communications device, such as communication device 200 in FIG. 2. These DTMF tones may then be converted into voice for transmission to the called or receiving party for the call in progress.

Figure 3:
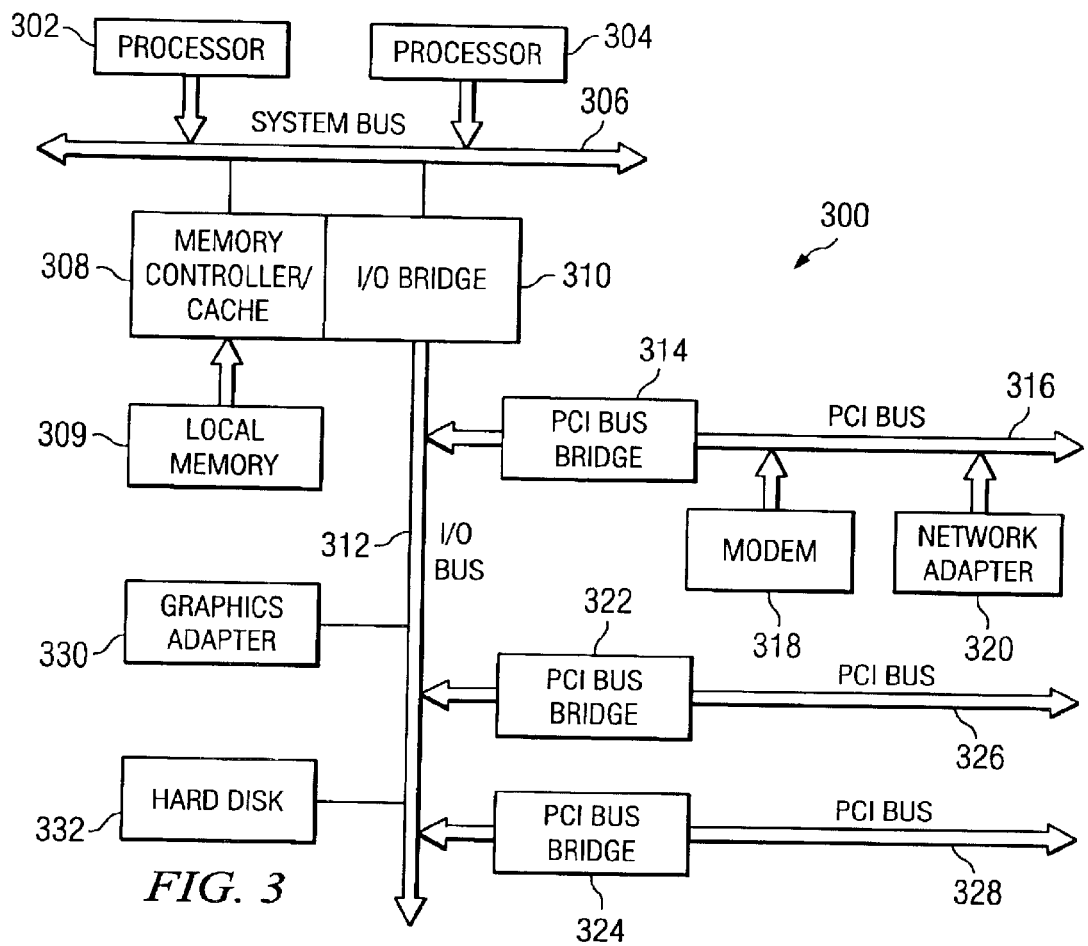
FIG. 3 is a block diagram of a data processing system that may be implemented as a server in accordance with a preferred embodiment of the present invention.

Referring to FIG. 3, a block diagram of a data processing system that may be implemented as a server, such as server 108 in FIG. 1, is depicted in accordance with a preferred embodiment of the present invention. Data processing system 300 may be a symmetric multiprocessor (SMP) system including a plurality of processor 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors.

Additional PCI bus bridges 322 and 324 provide interfaces for additional PCI local buses 326 and 328, from which additional modems or network adapters may be supported. In this manner, data processing system 300 allows connections to multiple computers, routers or other devices in a communications system. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

Figure 4:
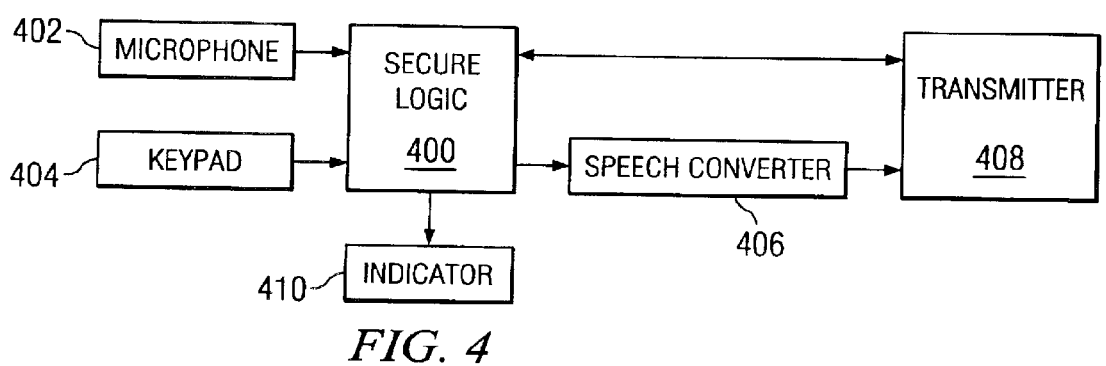
FIG. 4 is a block diagram illustrating components used in providing for a secure transfer of information in accordance with a preferred embodiment of the present invention.

Turning next to FIG. 4, a block diagram illustrating components used in providing for a secure transfer of information is depicted in accordance with a preferred embodiment of the present invention. In this example, secure logic 400 provides the privacy or security feature of the present invention for providing secure transfer of data. Secure logic 400 may be implemented using a processor or an ASIC, depending on the particular application.

Typically, during a telephone call, speech is detected by microphone 402 and transmitted to a called party. Additionally, signals may be generated by keypad 404. In these examples, the signals are DTMF tones. The secure data transfer feature of the present invention may be activated in a number of different ways in these examples. For example, a button may be specifically assigned to activate the feature in secure logic 400. Alternatively, a sequence of buttons depressed on a typical keypad may be used to initiate the secure data transfer features provided by secure logic 400. For example, a "*15" may be depressed by the user on keypad 404 to initiate the secure data transfer feature of the present invention. When this feature is initiated in these examples, input is taken from keypad 404 and not microphone 402 by secure logic 400. In these examples, signals from keypad 404 are translated or converted into speech by speech converter 406. This speech is then transmitted through transmitter 408 onto the communications network for receipt by a called party.

Further, a signal may be sent to the called party to generate an indication that a privacy feature has been initiated by the calling party. Indicator 410 may be activated by secure logic 400. In these examples, the indicator may be the display of a message on a LCD or a blinking light, depending on the particular implementation. The signal may be a particular DTMF tone or sequence of DTMF tones to indicate activation of the features in the illustrative examples.

The components illustrated in FIG. 4 may be implemented in a communications device, such as communication device 200 in FIG. 2. These components are shown to illustrate the features of the present invention and are not meant as limitations to the architecture of devices in which the present invention may be implemented. In the depicted implementation no modifications are necessary to communications network to allow this data transfer feature to be enabled. In other implementations, the feature may be provided through the communications network.

Figure 5:
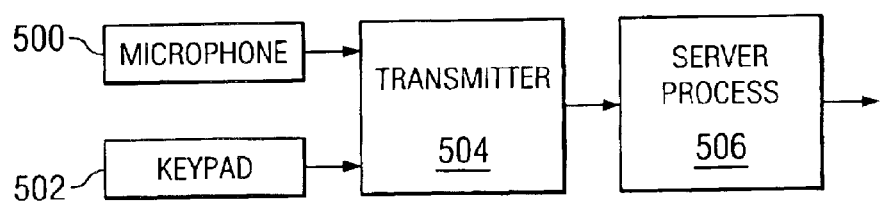
FIG. 5 is a diagram illustrating components used in providing a secure data transfer feature in a communications network in accordance with a preferred embodiment of the present invention.

Turning next to FIG. 5, a diagram illustrating components used in providing a secure data transfer feature in a communications network is depicted in accordance with a preferred embodiment of the present invention. In this illustrative example, a user at a telephone may generate voice transmissions through microphone 500 and also may generate signals to activate a secure data transfer feature through keypad 502.

The secure data transfer feature of the present invention in these illustrative examples may be activated through a voice command or some other user input, such as depressing one or more keys on a keypad, entered by the user. These transmissions are sent onto the communications network by transmitter 504 in these examples.

In this illustrative example, server process 506 provides the secure data transfer feature. When a signal is generated to indicate that such a feature is to be enabled, server process 506 takes signals generated by keypad 502 and converts those signals into voice or speech for transmission to a called party. Additionally, server process 506 also may generate a signal to activate an indicator on the called party to indicate that the secure data transfer feature has been enabled.

In this manner, such a feature may be provided to users without requiring users to have special equipment in their communications devices to use this secure data transfer feature of the present invention. In these examples, server process 506 may be implemented in a data processing system, such as data processing system 300 in FIG. 3.

Figure 6:
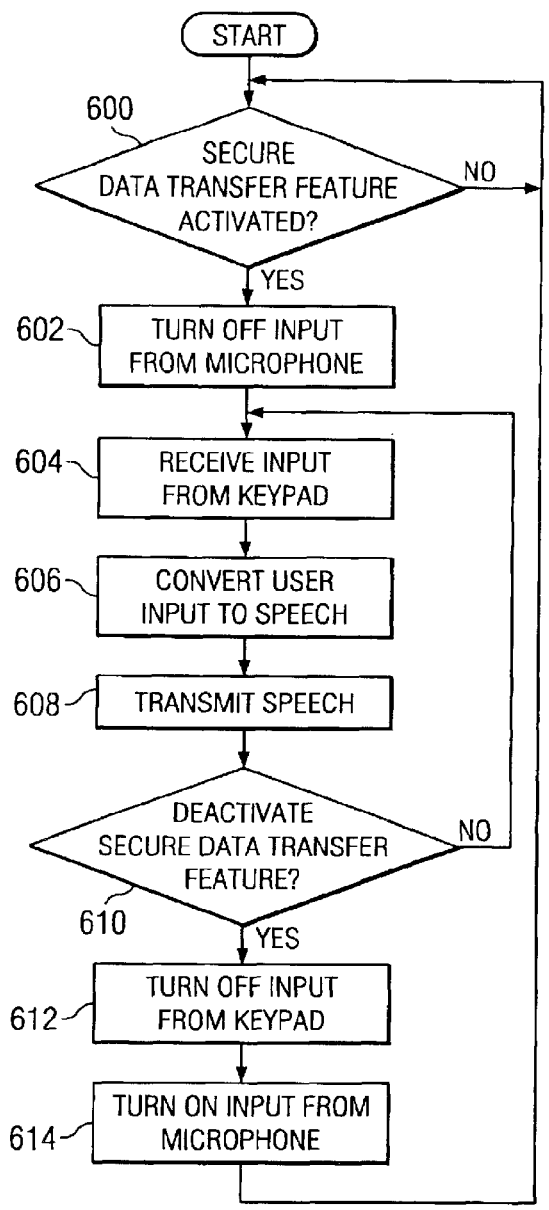
FIG. 6 is a flowchart of a process for providing secure data transmission in accordance with a preferred embodiment of the present invention.

Turning next to FIG. 6, a flowchart of a process for providing secure data transmission is depicted in accordance with a preferred embodiment of the present invention. The process illustrated in FIG. 6 may be implemented in a communications device, such as communication device 200 in FIG. 2.

The process begins by determining whether the secure data transfer feature has been activated (step 600). The process returns to step 600 until the privacy feature has been enabled. In these examples, the privacy feature may be enabled through some user input. This user input may be, for example, a signal or series of signals generated by keypad or a voice command, depending on the particular implementation.

Once the privacy feature has been activated, input is turned off from the microphone (step 602). Step 602 is an optional step in these examples. Input is then received from the keypad (step 604). The signals generated from the keypad are converted into voice or speech (step 606).

This signal to speech conversion may be implemented in different ways. For example, each of the keys assigned a number may have signals from that particular key converted into a spoken representation of the number. For example, a number "1" may be converted into the spoken word "one" by a text to speech converter. Further, different keys may be assigned different words for conversion from text to speech depending on the particular implementation. In this manner, different types of user input may be converted into different voice transmissions depending on the particular use.

The speech is then transmitted onto the communications network (step 608). Next, a determination is made as to whether the secure data transfer feature has been deactivated (step 610). If the privacy feature has not been deactivated, the process then returns to step 604. Otherwise, the input from the keypad is turned off or ignored (step 612) and the input from the microphone is turned back on with the process then returning to step 600 as described above.

Figure 7:
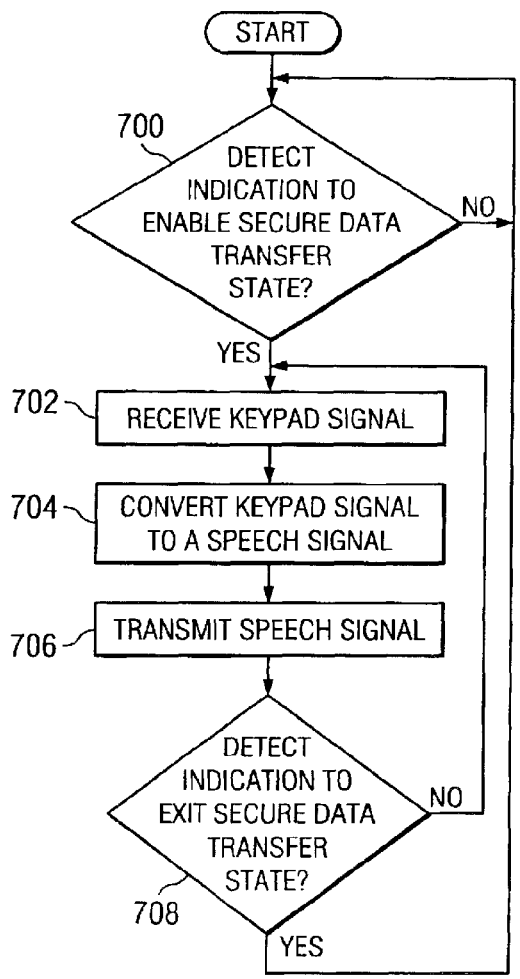
FIG. 7 is a flowchart of a process for providing a secure data transfer feature and a communications system in accordance with a preferred embodiment of the present invention.

Turning next to FIG. 7, a flowchart of a process for providing a secure data transfer feature in a communications system is depicted in accordance with a preferred embodiment of the present invention. The process illustrated in FIG. 7 may be implemented in a component in a communications system, such as data processing system 300 in FIG. 3.

The process begins by determining whether an indication to enable a secure data transfer state has been received (step 700). The process continues to return to step 700 until such an indication is received. Upon receiving an indication to enable the secure data transfer state, a signal from the keypad is received for processing (step 702). The keypad signal is converted into a speech signal (step 704). The speech signal is then transmitted to the called party (step 706). Next, a determination is made as to whether an indication has been received to exit the secure data transfer state (step 708). If such an indication is received, the process returns to step 700 as described above. Otherwise, the process returns to step 702 to receive another keypad signal.

The components and processes of present invention in the illustrative examples described above may be implemented for use in many situations in which privacy or secure transfer of information is required. For example, in a financial transaction, an individual client talks to a financial service provider representative on a telephone that is located in an environment that does not provide privacy, such as a shared office space or public telephone booth setting.

Typically, the financial service provider representative would authenticate the client credentials by asking for client's date of birth, social security number, address, and possibly mother's maiden name or such secret password. In this illustrative example, the following client information is present: the client date of birth is Jan. 1, 1975, the client social security number is 012-34-5678, and the client password is secret 123.

After the initial conversation between the parties, the client switches the conversation to secret or secure mode.

First, on the phone keypad, the client presses *#* (star, pound, star) to set the telephone to a privacy mode. Next, the telephone keypad's privacy mode indicator lamp lights up on both ends of telephone line. Now both parties are aware that they are operating in a privacy mode, and the phone instruments and all other intermediate components are made aware of privacy mode of operation.

Now, the client proceeds to answer the representative's first question of DOB in privacy mode. The client presses the following series of keys "01011975" for the date of birth in a MMDDYYYY format. This information is relayed to the remote side in either voice, display, or some other special mode such as Braille. The representative then presses *#* on the phone keypad to toggle telephone to public mode and ask the client for a social security number. On the phone keypad, client presses *#* to set the telephone back to a privacy mode. The telephone keypad's privacy mode indicator lamp lights up on both ends of the telephone line. Now both parties are aware that they are operating in privacy mode and the phone instruments and all other intermediate pieces are made aware of privacy mode of operation.

The client proceeds to answer the representative's second question requesting the social security number in the privacy mode. The client presses the following set of keys "012345678" for the social security number NNN-NN-NNNN format. This information is again relayed to the remote side in either voice or display or some other special mode such as Braille.

After receiving the information, representative presses "*#*" on the phone keypad to toggle telephones back to a public mode and asks the client for the secret password now. On the phone keypad, the client presses "*#*". The telephone keypad's privacy mode indicator lamp lights up on both ends of line. Now both parties are aware that they are operating in privacy mode and the phone instruments and all other intermediate pieces are made aware of privacy mode of operation. The client then proceeds to answer the representative's third question of secret password in the privacy mode. The client presses the following series of keys "733223723281123" to send the secret password.

When "" is pressed on the phone keypad, keypad interprets the key inputs in alphabetical mode. The process reads two digits at a time to derive a letter. For example, "73" maps to the letter "S" since on numeric key "7" three alphabetical letters "P", "R", and "S" are present. Letter "S" is in $3^{rd}$ position on numeric key "7" indicating letter "S". Using this logic, the following are the mappings for this illustrative example, -alphabetical mode; 73-S; 32-E; 23-C; 72-R; 32-E; 81-T; and **-Numeric Mode; 1; 2; and 3.

This information is relayed to the remote side in either voice or display or some other special mode such as Braille. Depending on the implementation, the client telephone may remain in the privacy mode while the representative's phone may allow for voice transmissions to the client.

Thus, the present invention provides an improved method, apparatus, and computer instructions for enabling a secure transfer of data over a communications network between two parties. The mechanism of the present invention allows a calling party to enter a secure transfer state in which signals from a keypad are converted into speech. The speech signal is then sent to the called party. In this manner, the calling party may send private or confidential information without others overhearing the information when the calling party is in a location that does not allow for privacy with respect to voice communications. The mechanism of the present invention may be applied to many situations lacking privacy such as public telephone booths, shared office rooms, or even in mobile phones being used by people in public places such as in trains or at concerts.

Further, this feature is especially useful when the called party is another human user. The conversion of the keypad signals into speech allows the called party to receive and understand the private or confidential information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for securely transferring information in a communications system, the method comprising:
   responsive to receiving an input indicating activation of a secure data transfer mode, converting signals from a keypad into speech signals; and
   transmitting the speech signals to a receiving party.

2. The method of claim 1, wherein the transmitting step comprises:
   correlating a signal from a key on the keypad to a word; and
   generating a speech signal representing the word.

3. The method of claim 1 further comprising:
   responsive to receiving the input, sending a selected signal to the receiving party, wherein a visual indicator is presented to the receiving party to indicate the secure data transfer.

4. The method of claim 1, wherein the converting step and the transmitting step are performed by a data processing system connected to the communications system and wherein the signals from the communications pad are dual tone multi frequency signals.

5. The method of claim 1, wherein the converting step and the transmitting step are performed in a communications device.

6. The method of claim 5, wherein the communications device is a telephone or a wireless communications device.

7. The method of claim 1 further comprising:
   preventing transmission of voice signals in response to receiving an input indicating activation of a secure data transfer mode.

8. A telephone comprising:

a processing unit;

a keypad connected to the processing unit;

a transmitter connected to the processing unit, wherein the transmitter sends signals into a communications network; and a microphone connected to the processing unit; and a transmitter connected to the processing unit, wherein the processor converts signals received from the keypad into speech signals in response to receiving an input indicating activation of a secure data transfer mode; and transmits the speech signals to a receiving party through the transmitter.

9. The telephone of claim 8, wherein the processing unit is a microprocessor or an application specific integrated circuit.

10. A server comprising:

a bus system;

a memory connected to the bus system, wherein the memory includes a set of instructions;

a communications adapter connected to the bus system; and a processing unit connected to the bus system, wherein the processing unit executes the set of instructions to detect an indication to enable a secure transfer state from a party to a call, receive DTMF signals from the party to the call; convert the dual tone multi frequency signals from the keypad into speech signals when the secure transfer state is enabled; and transmit the speech signals to a receiving party through the transmitter.

11. A data processing system for securely transferring information in a communications system, the data processing system comprising:

converting means, responsive to receiving an input indicating activation of a secure data transfer mode, for converting signals from a communications keypad into speech signals; and transmitting means for transmitting the speech signals to a receiving party.

12. The data processing system of claim 11, wherein the transmitting means comprises:

correlating means for correlating a signal from a key on the communications keypad to a word; and generating means for generating a speech signal representing the word.

13. The data processing system of claim 11 further comprising:

sending means, responsive to receiving the input, for sending a selected signal to the receiving party in which a visual indicator is presented to the receiving party to indicate the secure data transfer.

14. The data processing system of claim 11, wherein the converting means and the transmitting means are performed by a data processing system connected to the communications system and wherein the signals from the communications pad are dual tone multi frequency.

15. The data processing system of claim 11, wherein the converting means and the transmitting means are performed in a communications device.

16. The data processing system of claim 15, wherein the communications device is a telephone or a wireless communications device.

17. The data processing system of claim 11, wherein the transmitting means is a first transmitting means and further comprising:

second transmitting means for transmission of voice signals in response to receiving an input indicating activation of a secure data transfer mode.

18. A computer program product in a computer readable medium for securely transferring information in a communication system, the computer program product comprising:

first instructions, responsive to receiving an input indicating activation of a secure data transfer mode, for converting signals from the communications keypad into speech signals; and second instructions for transmitting the speech signals to a receiving party.

19. The computer program product of claim 18, wherein the second instructions comprises:

first sub-instructions for correlating a signal from a key on the communications keypad to a word; and second sub-instructions for generating a speech signal representing the word.

20. The computer program product of claim 18 further comprising:

third instructions, responsive to receiving the input, for sending a selected signal to the receiving party, wherein a visual indicator is presented to the receiving party to indicate the secure data transfer.

21. The computer program product of claim 18, wherein the first instructions and the second instructions are executed by a data processing system connected to the communications system and wherein the signals from the communications pad are dual tone multi frequency.

22. The computer program product of claim 18, wherein the first instructions and the second instructions are executed in a communications device.

23. The computer program product of claim 22, wherein the communications device is a telephone or a wireless communications device.

* * * * *